（12） United States Patent
Cottard et al.

(10) Patent No.: US 8,948,910 B2
(45) Date of Patent: Feb. 3, 2015

(54) DEVICE AND METHOD FOR LOADING SOLID PARTICLES INTO A CHAMBER

(75) Inventors: Bernard Cottard, Saint Romain de Colbosc (FR); Pascal Leroy, Montivilliers (FR)

(73) Assignee: Total Raffinage Marketing, Puteaux (FR)

( * ) Notice: Subject to any disclaimer, the term of this patent is extended or adjusted under 35 U.S.C. 154(b) by 622 days.

(21) Appl. No.: 12/743,318

(22) PCT Filed: Nov. 14, 2008

(86) PCT No.: PCT/FR2008/001602
§ 371 (c)(1),
(2), (4) Date: May 25, 2010

(87) PCT Pub. No.: WO2009/098372
PCT Pub. Date: Aug. 13, 2009

(65) Prior Publication Data
US 2010/0256803 A1    Oct. 7, 2010

(30) Foreign Application Priority Data
Nov. 15, 2007  (FR) .................................... 07 08014

(51) Int. Cl.
*G06F 7/00*    (2006.01)
*B01J 8/00*    (2006.01)
*B01J 8/04*    (2006.01)
*B65G 69/04*   (2006.01)
(Continued)

(52) U.S. Cl.
CPC  *B01J 8/002* (2013.01); *B01J 8/003* (2013.01); *B01J 8/0453* (2013.01); *B01J 8/0492* (2013.01); *B65G 69/0458* (2013.01); *G01F 23/284* (2013.01); *G01F 23/296* (2013.01); *B01J 2208/0061* (2013.01); *B01J 2208/00663* (2013.01); *B01J 2208/00752* (2013.01); *B01J 2208/00769* (2013.01); *B01J 2208/00778* (2013.01); *B01J 2208/00884* (2013.01); *B01J 2208/025* (2013.01)
USPC ............. 700/218; 422/219; 73/865; 414/301; 141/5; 250/343

(58) Field of Classification Search
USPC ......................................................... 700/218
See application file for complete search history.

(56) References Cited

U.S. PATENT DOCUMENTS 4,339,664 A    7/1982  Wiklund et al.
5,753,585 A    5/1998  Minami
5,795,550 A *  8/1998  Minami ........................ 422/219
(Continued)

FOREIGN PATENT DOCUMENTS

EP    0727250  A2    8/1996
FR    2454603  A1    11/1980
(Continued)

*Primary Examiner* — Gene Crawford
*Assistant Examiner* — Kyle Logan
(74) *Attorney, Agent, or Firm* — Sughrue Mion, PLLC (57) ABSTRACT

The invention relates to a device for loading solid particles into a vessel comprising:
  particle feed means (24);
  means (26) for dispersing the particles from the top to the bottom of the vessel;
  at least one means (17) for measuring the height of the filling bed; and
  at least one automated system for controlling the feed means (24) and/or the dispersion means (26),
and also to a process and uses implementing the device.

18 Claims, 4 Drawing Sheets

(51) Int. Cl.
*G01F 23/284* (2006.01)
*G01F 23/296* (2006.01)

(56) References Cited

U.S. PATENT DOCUMENTS

| | | |
|---|---|---|
| 2004/0031335 A1* | 2/2004 | Fromme et al. .................. 73/865 |
| 2004/0191136 A1* | 9/2004 | Early ............................ 422/219 |
| 2006/0201245 A1* | 9/2006 | Huber et al. ................. 73/290 R |
| 2007/0261487 A1* | 11/2007 | Sintes et al. ................. 73/290 V |
| 2007/0297880 A1* | 12/2007 | Pinon et al. ..................... 414/301 |
| 2008/0128045 A1* | 6/2008 | Zahirovic .......................... 141/5 |
| 2009/0184249 A1* | 7/2009 | Mound et al. .................. 250/343 |

FOREIGN PATENT DOCUMENTS

| | | |
|---|---|---|
| FR | 2872497 A1 | 1/2006 |
| JP | 10-043576 A | 2/1998 |
| WO | 2008/047050 A1 | 4/2008 |

* cited by examiner

DEVICE AND METHOD FOR LOADING SOLID PARTICLES INTO A CHAMBER

CROSS REFERENCE TO RELATED APPLICATIONS

This application is a National Stage of International Application No. PCT/FR2008/001602 filed Nov. 14, 2008, claiming priority based on French Patent Application No. 0708014, filed Nov. 15, 2007, the contents of all of which are incorporated herein by reference in their entirety.

The present invention relates to the field of loading solid particles into all types of vessels, especially industrial reactors, in particular chemical reactors. It relates more precisely to a device, a process and uses thereof for loading a vessel, in particular a chemical reactor, with a divided solid, especially with a catalyst.

The invention relates more particularly to a device and to a process for loading reactors, especially fixed-bed reactors of chemical, electrochemical, petroleum or petrochemical type, with solid particles, in particular in the divided state.

The particles may be in the form of beads, grains, cylinders, discs or rods, or in other forms, and are generally of small size. They may be molecular sieves, solid catalyst grains, which are generally present in the form of extrudates of single-lobe or multilobe type, the size of which may vary from a few tenths of a millimeter to a few centimeters.

Many devices intended for filling a vessel, especially a chemical or petrochemical reactor, with solid particles are known and described in the art.

These devices and their associated processes attempt to meet the numerous quality criteria, such as the loading rate, homogeneity, density of said loading and, of course, they must allow a loading that conforms to safe practice guidelines as regards the operators and goods.

The loading time is an important parameter in the filling of the vessels. This is because the faster a reactor, for example one that is integrated into a unit for treating a hydrocarbon-based product, is loaded, the shorter the downtime of the unit involved in the manufacturing process, thus allowing a faster restart. This factor is of prime importance in so far as the downtime cost can be very high.

It is moreover essential that the loaded bed of solid particles, also known as the "catalyst bed" exhibits good homogeneity.

The homogeneity is improved by a loading in which the "filling front" also known as the "loading profile", that is to say the interface between the upper part of the catalyst bed and the as yet unfilled part of the reactor, has a profile closest to the horizontal, or even horizontal. This is in order to obtain a very uniform distribution of the particles in the catalyst bed.

Respect for this loading quality criterion is very important, even essential, in order to promote constant and uniform flow of the fluid to be treated and reaction kinetics throughout the entire volume of the catalyst bed and thus to allow an improvement in the use of the catalyst, for example by limiting, or even preventing, preferential paths from being created and thus the entire catalyst mass from failing to be used homogenously.

Another factor of importance in the field of loading reactors relates to the loading density. Generally, notwithstanding, for example, the pressure drop phenomena, the density of particles present in the reactor is proportional to the efficiency of the chemical reaction.

This density is defined from the amount of catalyst mass loaded into the vessel and from the height (corresponding of course to a volume) of the catalyst bed. The height is normally measured by an operator and generally requires the loading to be stopped so that the operator can measure said height, for example using a plumb line, in a generally dusty atmosphere.

Several existing loading devices and processes, especially those known as "rain effect" devices and processes, may prove inadequate in terms of filling rapidity and/or quality, especially by departing, to a greater or lesser extent, from the horizontality of the filling front.

Various known devices do not allow, in general, the rapid, or even continuous, measurement of the progression of filling and/or do not take into account the internal geometry of the vessel. Specifically, the inside of the vessel to be filled may comprise "irregularities", such as thermocouple arms positioned at various levels of the catalyst bed, said thermocouples being intended to measure the internal temperatures of said bed at several levels of the reactor.

These irregularities may behave as obstacles to the good distribution of the solid particles forming the catalyst bed and may require occasional specific adjustments of the loading devices in order to get round said obstacles, especially to obtain a loading for which the filling front is as close as possible to the horizontal.

Other loading devices making use of a feed sock, dropped into and suspended inside the reactor, may have significant dangers for the operators, especially in the case of detachment or tearing, when these operators are at the bottom of the reactor in order to orient the sock loaded with particles in order to drive said loading.

This is the reason why, in order to obtain an optimum loading quality, the Applicant has proposed several devices and associated processes for filling vessels, especially large-sized vessels, with solid particles, for example in European Patent Application EP 0 007 854 and its improvements disclosed in Applications EP 0 116 246 and EP 0 769 462.

More recently, the Applicant has proposed, in order to further improve the characteristics of the loading of large-sized vessels with solid particles, a novel type of device described in Patent Application FR 2 872 497 which consists of a system for distributing said particles equipped with a hollow central shaft.

However, and despite the recent improvements made to the device, a certain number of drawbacks may remain, for example due to a malfunction of the device during loading or to an external disturbance.

These drawbacks are, for example:
inadequate homogeneity of the particles in the catalyst bed, possibly exhibiting, in particular, a "lack" of horizontality of the filling front;
a density that does not conform to, and in particular is lower than, the desired density;
an abnormally high loading time; and/or
too many human interventions during loading.

In addition, the Applicant, in the course of its research in the field, has highlighted a certain number of requirements in order to increase the efficiency of such loadings, and in particular:
to provide a better measurement of the height of the catalyst bed during loading by increasing the frequency and the precision of the measurements;
an improvement in monitoring the appearance of the surface of the loading profile with recognition and remedies associated with possible slope defects and/or unevenness of said loading profile; and
improved automation of the loading making it possible, in particular, to intervene directly in real time in the device starting from the recognition of the parameters mentioned above, in order to further decrease the loading time while reducing human interventions to their strict minimum.

These drawbacks and needs for improving the efficiency of the loading are all the more pronounced when the filling is carried out with particles that create, during the filling, a great optical interference. The term "great optical interference" is understood in the sense of the present invention to mean that the conditions do not allow correct and/or immediate optical visualization of the appearance of the filling front. This optical interference is generally due to the presence of many dusts which form in the loading device, for example from catalyst grains in a chemical reactor, dusts which are present in more or less significant quantities depending on the type of catalyst to be loaded.

Solutions have been proposed for improving the continuous control of the loading of a vessel with solid particles.

For example, Japanese Patent Application JP 7-242337 discloses a process and a device for monitoring the filling of a vessel (reactor) with a granular catalyst.

The device described comprises a filling means, located in the centre of the upper part of the vessel, sprinkling catalyst grains, and also a device that emits a laser beam that scans the surface of the filling front and a means that detects the laser beam emitted by the emitting device and reflected by the surface of the loading front.

The emitting and detecting devices are attached to the wall of the vessel, level with the filling means. This system has the drawback of being relatively difficult and lengthy to install inside the vessel to be filled, thus undesirably increasing the idle period of the reactor.

Furthermore, this system, comprising a telemetric measurement means level with the filling means, cannot function correctly or cannot function at all, with the dense loading device described in FR 2 872 497. This is because the presence of the rotating deflectors between the filling front and the telemetric measurement system would disturb the laser measurements, especially at the end of loading.

Furthermore, the laser measurement technology is not high performance, or is even unsuitable, in a dusty environment such as that of loading a reactor with catalyst grains.

Thus there remains a need for a filling device that makes it possible to completely or partly solve the problems mentioned above, and which makes it possible to:
  carry out automated measurements of the height and/or of the appearance of the filling front of the catalyst bed at a high frequency, especially without the loading being stopped or during a brief stop in loading;
  carry out these measurements with precision, for example over the central height of the catalyst bed, and also over the loading profile of said bed, at the very least over a large part, without being dependent on the amount of dust generated during loading;
  carry out these measurements without human intervention in the vessel;
  automate the loading of the vessel, for example starting from the results of said measurements in order to minimize dangerous human intervention; and
  fill the vessel automatically with solid particles in a homogenous and precise manner while precisely defining the density of the loading via a better knowledge of the parameters of said loading.

During its numerous research studies, the Applicant has developed a novel device which may especially use the dense loading system (Densicat®) disclosed in FR 2 872 497, with great set-up and operating ease. The present invention makes it possible to automate and/or to improve the loading of a reactor via better monitoring of the height of the catalyst bed during loading and/or of the appearance of the surface of the filling front.

The presence of automated systems intervening in the parameters for adjustment of the device may allow a reduction in human interventions during loading and especially dangerous human interventions inside the reactor.

According to a first aspect, one subject of the present invention is a device for loading solid particles into a vessel comprising:
  particle feed means;
  means for dispersing the particles from the top to the bottom of the vessel;
  at least one means for measuring the height of the filling bed; and
  at least one automated system for controlling the feed means and/or the dispersion means.

The device according to the invention may be independent of the vessel to be loaded, and in particular removable. This has the advantage of permitting the successive loading of several vessels with a single device.

It comprises at least one feed means enabling the dispersion means to be fed with solid particles, especially from the top to the bottom.

This feed means may comprise, upstream, at least one shut-off, in particular automated, valve. It may be, for example, fed through at least one hopper, essentially equipped with a shut-off valve. The feed means may partially or completely surround the central shaft of the dispersion means, in particular a central shaft as defined below.

The feed means may be provided with at least one, especially automated, closure means. In particular, this closure means may be of the shutter type, for example flaps, the displacements of which may be carried out by jacks or by any means known in the art, which may be remote-controlled.

These closure means are intended to completely or partially, automatically block at least one orifice or at least one group of orifices for discharging solid particles, in particular that are positioned above the dispersion means.

These closure means may thus make it possible to control the flow rate of particles from the discharge orifices, during the operation of loading the vessel, and more particularly during the dispersion of the particles.

The management of the streams of solid particles or of catalyst grains arriving at the dispersion means may thus be controlled, in particular in order to be able to act on the loading profile. Specifically, the control of the flow rate of each discharge that has an influence on the dispersion of the particles may make it possible, with certain adjustments, to create or to overcome irregularities, such as hollows and humps. More particularly, the restrained control makes it possible to obtain a loading profile in accordance with the desired setting profile, that is to say generally flat and horizontal.

According to one particular embodiment, the dispersion means comprises a central shaft, optionally hollow, attached to which are deflectors of strip type, preferably that are semi-rigid. Said shaft is rotated by a drive means which may be a motor, for example off-centered with respect to the shaft, supplied with a gas, preferably chosen from nitrogen and air.

The axis of rotation of the central shaft which may rotate at a rate ranging from 10 to 300 rpm and preferably from 40 to 200 rpm, is generally parallel to the longitudinal axis of the reactor. However, this axis of rotation may be offset in an automated manner relative to said axis of the vessel using at least one automated jack, in particular during the loading or during a break in loading. The offset may be an angle ranging up to 45°, especially up to 30°, relative to the longitudinal axis of the vessel, in order to correct possible unevenness.

The central shaft of the dispersion means is generally positioned over the longitudinal axis of the vessel, but it may be shifted, for example automatically using at least one automated jack, during the loading or during a break in loading, parallel to this axis, by a distance ranging up to 50 cm, and in particular ranging up to 20 cm from the position of the longitudinal axis of the vessel.

The variations in position of the central shaft combined with variations in its rotational speed, may make it possible to modify the distribution of the particles in the vessel.

The loading device may comprise an automated control system comprising jacks allowing, in particular, automated actions for modifications of the adjustment parameters of the feed means and/or of the dispersion means, in particular according to the data from the measurements of the height and/or from the analysis of the filling front of the catalyst bed during loading.

The device comprises at least one measurement means that makes it possible to determine the height of the bed of particles during loading.

The expression "measurement that makes it possible to determine the height of the bed of particles" is understood in the sense of the present invention to mean the distance measured between the measurement means (or the upper internal plate of a chemical reactor closest to the measurement means) and one or more points, for example from two to several tens of points, included in a defined central zone on the filling front.

Next, from these measured distances, the height between these same measured points and the ground or the lower end of the bed is calculated in order to deduce therefrom, in the latter case, the height of the bed of particles during loading or, in fine, then loaded.

The measurement means may be chosen from the field of electromagnetic or acoustic emissions, for example of radar and/or sonar types, or any technique known in the art allowing an instantaneous and precise distance measurement in a hostile, especially dusty, medium.

In particular, the means for measuring the filling height is positioned completely or partly above or below the dispersion means, and in particular the strips in the case of the device described in FR 2 872 497, and especially below the strips. When it is positioned below the dispersion means, the measurement means may be positioned completely or partly inside the fixed hollow tube of the central shaft of the device.

According to one particular embodiment, the means for measuring the height of the filling bed is provided with at least one displacement means that allows the measurement means, via a connection means, to be either housed in the fixed hollow tube located in the rotating hollow shaft, or to partly or completely emerge from said hollow tube, in particular in order to be able to take measurements.

The means for measuring the height of the filling bed is not generally firmly attached to the rotating hollow shaft, but the invention may be applied, in the opposite case, in particular with a computer program suitable for processing new measurements.

The radars may have a measurement time less than or equal to 1 minute, in particular less than or equal to 10 seconds, or even less than or equal to one second. The radars may have an outer diameter less than or equal to 200 mm, and especially less than or equal to 130 mm.

Their height may be less than or equal to 1000 mm, and in particular less than or equal to 500 mm.

The radars may have an emission cone angle of 22°, especially of 8°, or even of 4°.

Most particularly, the radar may be of the VEGAPULS 68 or VEGAPULS 67 type sold by VEGA, having an emission cone angle of around 8°.

The sonars may have a diameter less than or equal to 50 mm, or less than or equal to 20 mm, or even less than or equal to 16 mm.

Their height may be less than or equal to 40 mm, or even less than or equal to 12 mm and they may have an emission cone angle of the waves of 8°.

In particular the sonar(s) used may be sonars sold by ALCTRA.

The device may also comprise at least one means for measuring the loading profile, especially of the same type as the means for measurement of the height of the filling bed. In particular the same means makes it possible to determine the measurement of the height of the bed of particles and the measurement of the loading profile.

The expression "at least one means for measuring the loading profile" is understood in the sense of the present invention to mean a means for measuring the distance between the measurement means and a certain number of points distributed substantially over the entire surface of the loading front and that makes it possible to obtain a representation in two or three dimensions of the surface of the filling front.

The means for measuring the loading profile may allow measurements at various points spread over the entire diameter (2-D) or over the entire surface (3-D) of the bed of solid particles, either because it is capable of taking simultaneous measurements in several directions, especially from several measurement means, especially transmitters/detectors positioned, for example, in a hemisphere volume, or because it is movable and can take sequential measurements from various points or zones of the filling front by carrying out a controlled movement.

In particular, the means for measuring the loading profile makes it possible to measure the height of at least one point of each unit of surface area of the filling front. The unit of surface area may be less than or equal to 0.2 $m^2$, especially less than or equal to 0.1 $m^2$, in particular less than or equal to 0.05 $m^2$, or even less than or equal to 0.01 $m^2$.

The means for measuring the height of the filling bed and/or of the loading profile may most particularly measure, in a single measurement, the heights of a set of points of one surface area, and thus make it possible to obtain a three-dimensional representation.

According to a first embodiment, the means for measuring the height of the filling bed and/or of the loading profile is positioned over the longitudinal axis of the vessel and/or of the central shaft.

According to a second embodiment, the axis of the means for measuring the height of the filling bed and/or of the loading profile may be different from the longitudinal axis of the vessel and/or of the central shaft.

In particular, the measurement means may be equipped with at least one angular motor means that makes it possible to vary the measurement angle. The measurement angle may be an angle ranging up to 30°, in particular an angle ranging up to 45°, or even an angle ranging up to 60°, most particularly an angle ranging up to 80° relative to the longitudinal axis of the vessel.

Most particularly, in the case where at least one angular motor means is present, it may make it possible to increase the measurement angles when the height of the filling bed increases.

The device may comprise several means for measuring the loading profile. In particular, these measurement means may have a different measurement axis, for example in order to make it possible to measure several surfaces at the same time. Most particularly, these means are positioned over a radius of a curve, especially a circular curve. This may especially make it possible to measure the loading profile by rotating the various measurement means.

The means for measuring the height of the filling bed and/or of the loading profile may be equipped with angular and/or rotary motor means enabling these measurement means to carry out a defined rotational movement, in particular to be displaced by a determined angle of rotation.

The means for measuring the loading profile may carry out controlled rotational movements, in particular in a horizontal plane or in three dimensions.

More particularly still, the measurement means may be positioned so as to make it possible to measure the heights over the entire loading profile of the catalyst bed of the vessel, in particular in "one go". The measurement means may then be positioned according to angles that allow measurements over the entire surface of the loading front, in particular they may be positioned according to a spheroidal or cylindrical shape or according to any suitable geometrical shape.

The means for measuring the height of the filling bed and the means for measuring the loading profile may allow measurements with a precision of less than 10 cm, in particular less than 1 cm.

The measurements of the loading profile may especially be carried out from the beginning of the filling, up to a height of the filling bed of a few tens of centimeters relative to the measurement means, that is to say when the vessel is considered to be full of solid particles.

In particular, the means for measuring the height of the filling bed and/or of the loading profile make it possible to carry out measurements under conditions of reduced visibility, especially in a dusty, or even very dusty, atmosphere and/or that comprises vapours of various types.

According to one particular embodiment, the device comprises means for comparing the desired loading profile and the measured loading profile. These comparison means may especially be computer implemented.

Most particularly, the desired loading profile is horizontal. However, the inside of the vessel to be filled may have elements capable of disturbing the dispersion and/or the arrangement of the particles during loading and therefore the horizontality of the loading profile, especially the presence of thermocouple arms inside the vessel as mentioned previously.

In particular, the desired profile is derived from a theoretical, or even mathematical, model for filling of the vessel, from an experimental model, or from a combined experimental and theoretical model.

Depending on the calculated height of the bed of particles in the vessel starting from at least one measurement of the filling height and the result of the comparison of the measured loading profile with the desired or theoretical loading profile and taking into account the mathematical model expressing the internal shape of the vessel, it may be useful to modify the parameters for adjustment of the dispersion means, for example its direction of rotation, in order to obtain a loading profile as close as possible to the desired loading profile.

The device according to the present invention may allow an automated modification of the filling and/or dispersion parameters, in particular via:
  adjustment of the dispersion means, such as the direction of rotation and the speed of rotation of the deflectors;
  the loading flow rate, which may especially be adjusted via at least one shut-off valve of the feed flow rate;
  the positioning of the hollow shaft, especially by the offset of the axis of the hollow shaft relative to the longitudinal axis and/or axis of symmetry of the vessel and/or the vertical axis;
  inclination of the dispersion means relative to the longitudinal axis of the vessel, especially by an inclination of a few degrees; and/or
  adjustment of the various streams of particles onto the deflectors, especially via the partial or complete opening of lower and/or side discharge orifices or groups of discharge orifices.

According to one particular embodiment, the measurements are carried out over a few seconds, especially a few tenths of a second and in particular without stopping the loading, leading de facto and in real time to the possible modifications on the parameters, mentioned above, of the various means linked to the loading device. Of course, these measurements may also be carried out during a stop in loading with deferred recognition of the automatic modifications of the parameters for adjustments of the loading device.

According to another of its aspects, one subject of the invention is a process for loading solid particles into a vessel, in which:
  said particles flow from the top to the bottom;
  the height of the particle bed and the loading profile are measured, especially continuously and/or intermittently during loading; and
  the loading parameters are adjusted, especially according to the height of the filling bed, and/or of the loading profile.

In particular, the result of the measurements is compared with at least one determined model and, most particularly, the possible deviations observed by controlled and automatic actions on the various parameters for adjusting the loading device are reduced. The process uses, in particular, a device as described in the present document.

The measurement requires that loading be stopped for less than 10 minutes, especially less than 5 minutes, in particular less than 1 minute, and preferably does not require loading to be stopped.

The parameters of loading, of the feed means and/or of the dispersion means are adjusted as a function of the results of the measurements of the height of the bed of particles and/or of the loading profile, in particular relative to a model that takes into account the internal geometric characteristics of the vessel to be loaded. More particularly, these comparisons and adjustments are automatic and controlled by a computer which gives orders to motorized mechanical means.

The means for measuring the loading profile may measure the height of at least one point for each unit of surface area representing less than 20% and preferably less than 10% of the total surface area.

According to another of its aspects, another subject of the invention is the use of the device according to the invention or of the process according to the invention, for carrying out the loading of at least one catalyst bed in a chemical reactor for the hydrotreatment of hydrocarbons.

The invention is now described with reference to the non-limiting figures, in which.

Figure 1:
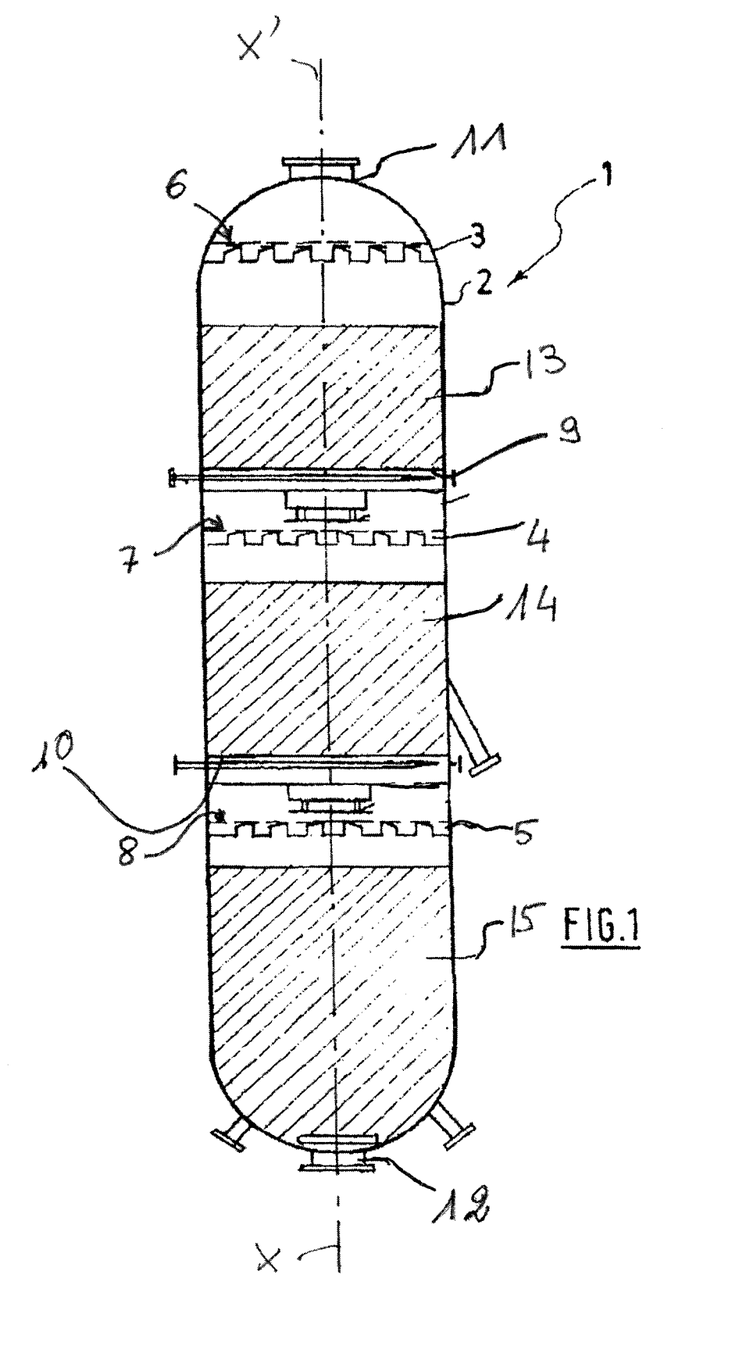
FIG. 1 is a transverse cross section of a catalytic vessel for which a catalyst bed is in the process of being loaded.

FIG. 1 displays a catalytic vessel (1) made up of three beds normally loaded with solid particles such as catalyst grains. This vessel, known as a reactor in the trade, comprises an outer wall (2), plates (3, 4, 5) for distributing the load to be treated that are made up of several vents, themselves surmounted by plates (6, 7, 8) for the pre-distribution of the load, and support plates (9, 10) for the catalyst bed.

The pre-distribution plates and also the support plates for the catalyst beds are normally pierced with numerous holes intended for the flow of the load and of the reactive fluid flowing co-currently and comprise, like the vented plate, a larger opening or "manhole" that is blocked during operation.

As its name indicates, this manhole, when it is open, permits, amongst other things, the free passage of an operator inside the reactor. The reactor (1) also comprises an upper opening (11) and a lower opening (12) for the inlet and outlet of fluids. This reactor (1) comprises three separate catalyst beds (13, 14, 15), the upper bed of which is in the process of being loaded (catalyst shower in the direction of the bed not shown) with the device (16) and the process that are the subjects of the present invention; the device (16) being partly described in FR 2 872 497. The measurement means of sonar type (17) of the device (16) is represented in action in FIG. 1, that is to say that the sonar is in the process of measuring (18) the height of the upper catalyst bed.

The device according to the invention is capable of being placed, for example, on one of the pre-distribution plates (6, 7 or 8) level with the manhole depending on whether it loads and forms the beds (13, 14 or 15) with catalyst grains, or optionally on the upper opening (11) in case of loading above the upper pre-distribution plate.

Depending on the catalyst beds to be loaded, the device that is the subject of the present invention is introduced into the vessel via the upper opening (11), or the manholes, the diameter of which is less than or equal to 80 cm, especially less than or equal to 60 cm, or even less than or equal to 50 cm.

The complete loading of the catalytic vessel (1) using the device and the process that are subjects of the present invention will be carried out in three steps:
1/loading of the lower bed with the device installed level with the manhole located on the pre-distribution plate (8);
2/loading of the intermediate bed with the device installed as above on the plate (7); and
3/loading of the upper bed with the device installed on the pre-distribution plate (6).

Each of the catalyst beds comprises, in its lower and upper parts, small beds (19, 20, 21, 22, 23) of inert beads mainly composed of alumina which are intended to retain the catalyst grains in the lower part of the catalyst bed and to distribute the load in its upper part. The bed of inert beads above the catalyst bed (13) is not represented in the present FIG. 1 since the latter is in the process of being loaded.

The device that is the subject of the present invention is initially positioned at each of the three steps described above by making the axis of its rotational shaft (Z'Z) correspond with the axis (X'X) of the vessel to be loaded.

Figure 2:
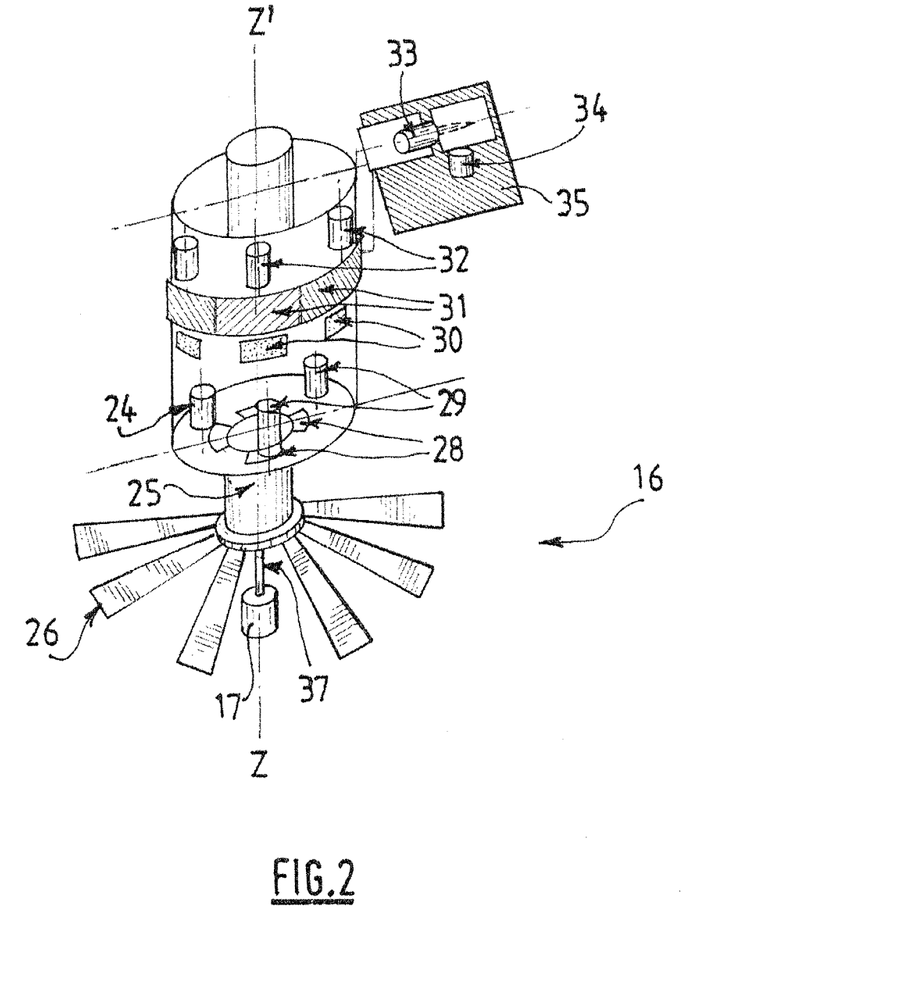
FIG. 2 represents a partial view of the device in three dimensions.

FIG. 2 represents a partial view of the device (16) in three dimensions.

Represented in this figure are the solid particle feed means (24), here the solid particles are catalyst grains, the dispersion means formed from a rotating hollow shaft (25) equipped with its deflectors, especially of the strip type, partly represented over a single level (26) and the means (17) for measuring the height and/or the profile of the loading front equipped with its connection means (37), positioned completely under the deflectors (26), and more precisely installed under the fixed hollow shaft (not represented) held inside the rotating hollow shaft (25).

The deflectors (26) may be attached via flexible fasteners.
The feed means may comprise:
horizontal shutters (28) of which the opening and/or the closing is(are) automatically remote-controlled by the jacks (29);
side openings (30) which may be partially or completely covered by shutters (31) controlled automatically by the jacks (32);
at least one jack (33) for controlling the horizontal displacement of the device, parallel to the longitudinal axis of the reactor, by a distance less than or equal to 50 cm, or preferably less than or equal to 20 cm; and/or
a jack (34) that makes it possible to vary the axis of rotation of the device by an angle of less than 45° and preferably less than 30° relative to the longitudinal axis of the reactor.

The jacks (33 and 34) may have a fixed point (35) located on the reactor in order to operate.

The types of jacks that equip the device are known in the art and have to be able to operate in a dusty atmosphere composed mainly of solid particles, especially catalyst grains.

Figure 3:
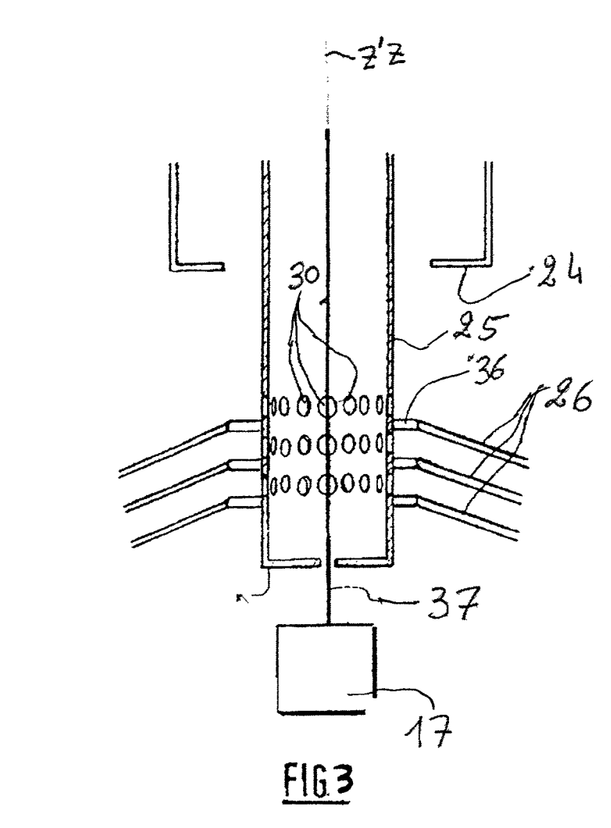
FIG. 3 is a partial transverse cross-sectional view of a device according to one embodiment of the invention.

FIG. 3 represents one particular embodiment of the device according to the invention. The means for dispersing the solid particles comprises a rotating shaft (25) composed of a hollow tube on which fasteners (36) connect the flexible deflectors (26), generally composed of a flexible material of rubber type, to said rotating shaft (25).

The rotating hollow shaft (25), comprises inside it a fixed hollow tube (38), attached to the feed means (24) in which the means (17) for measuring the height of the filling bed and/or of the loading profile are positioned.

The measurement means (17) may comprise at least one connection means (37), for example partly housed in the fixed hollow shaft (38) as indicated in FIG. 3. The connection means (37) may enable communication between the measurement means (17) and the control and calculation means, especially a computer. It may also be formed in such a way that it provides for the displacement of the measurement means (17), in vertical translation and/or in rotation.

The measurement means (17) may comprise one or more measurement device(s), for example a plurality of radars and/or of sonars, in particular that allow instantaneous measurements of different zones on the filling front. Most particularly, the measurement means is present in the form of a "faceted ball", each of the facets of which is made up of a measurement device, especially a sonar or a radar.

The rotating hollow shaft (25) may be provided with orifices for sucking up dust (not represented) generated during the impact of the solid particles on the deflectors (26).

Figure 4:
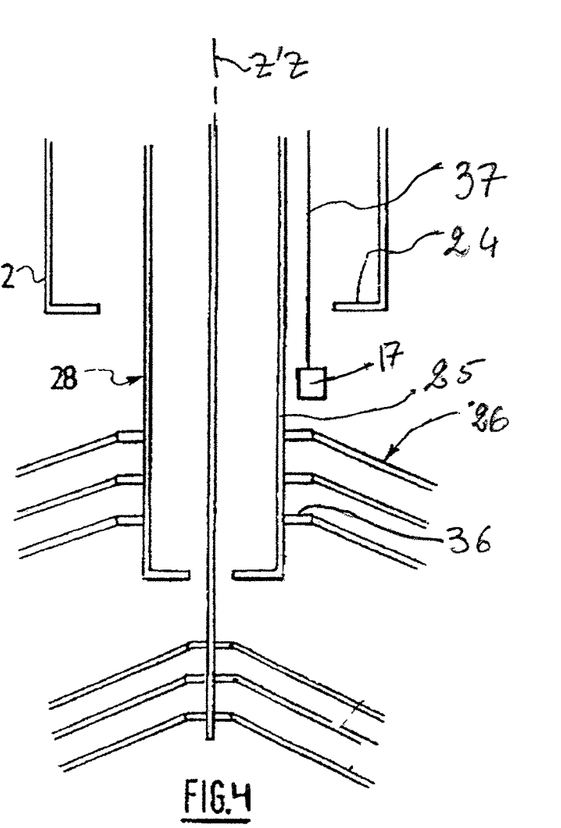
FIG. 4 is a partial transverse cross-sectional view of a device according to another embodiment of the invention.

FIG. 4 represents another embodiment in which the means for dispersing the solid particles comprises a rotating hollow shaft (25), positioned on which are dispersion means comprising fasteners (36) that connect the flexible deflectors (26) to the hollow shaft (25).

The rotating hollow shaft (25) comprises, within it, a fixed hollow tube (38) attached to the feed means (24).

The measurement means (17) is borne by at least one connection means (37) that passes into the feed tube (24). This measurement means may be housed in the feed tube (24)

and raised or lowered, especially underneath the deflectors, when the latter are not moving, in order to take measurements.

The impact of the rotating deflectors on the measurement of the levels of the catalyst bed or of the loading front may first be considered as measurement background noise and subtracted from each of said measurements.

The internal diameter of the hollow tube may be less than or equal to 200 mm, especially less than or equal to 180 mm, in particular less than or equal to 160 mm, or even less than or equal to 140 mm, and most particularly less than or equal to 130 mm.

Figure 5:
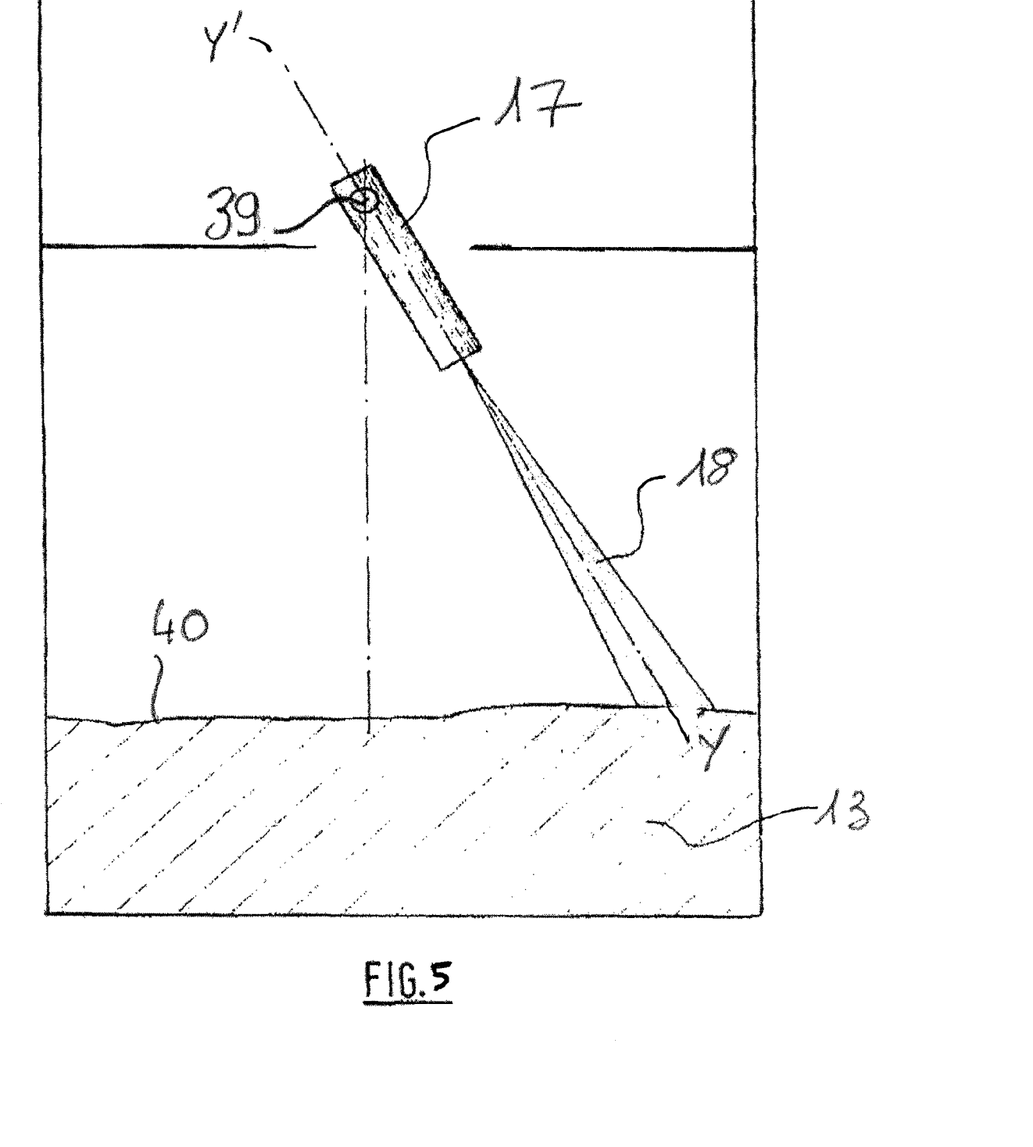
FIG. 5 is a transverse cross-sectional view of a measurement means equipped with a radar that allows measurements of the surface area of the loading front.

FIG. 5 shows a particular assembly of a radar-type measurement means (17) positioned on the longitudinal axis X'X of the reactor to be loaded (not shown) and mounted on a horizontal axis (39) around which said measurement means (17) may pivot using an angular motor means that equips said measurement means (17). The measurement means (17) being positioned immediately under the fixed hollow tube (38).

The horizontal axis is connected mechanically to a connection means (37) which may also provide a rotational movement around the axis X'X. Thus the measurement means (17), and more precisely its scanning beam (18), may scan the surface (40) of the loading front of the catalyst bed (13) along the axis Y'Y. This is carried out by varying, for example, in a programmed manner, the angle α and the speed of rotation around the axis X'X, and therefore making it possible to carry out measurements of the profile over the entire surface area (40) of the filling front of the catalyst bed.

The axis (Y'Y) of the measurement means (17) may be positioned over the longitudinal axis (X'X) of the vessel to be loaded or the axis (Y'Y) of the measurement means (17) may be different from the longitudinal axis (X'X) of the vessel to be loaded. Of course, in the case where the measurement means may be rotated, it can, at one moment, be in one position and, at another moment, be in another position.

According to one variant, the measurement means (17) may be attached to the rotating hollow tube (25).

EXAMPLE

Two superposed catalyst beds were loaded in an axial-type chemical reactor.

Each of the two beds measured 8 meters in height and the diameter of the reactor was 4 meters.

The load of hydrocarbons to be treated flowed co-currently in the reactor with the reactive gas, generally hydrogen alone or as a mixture.

The 100 tons of catalyst used to form the lower bed were loaded with a dispersion means operating in "rain effect" and having a rotating hollow shaft bearing strip-type deflectors.

The upper bed (also 100 tons of catalyst) was loaded with a device according to the present invention comprising the same dispersion means as for the lower bed. The loading process as described in the present document was also applied to the loading of the upper bed.

In the two loading cases, the axis of the rotating hollow shaft was superposed over the longitudinal axis of the reactor.

1/Loading of the Lower Bed

In order to confirm a conforming loading of the catalyst bed, namely for example a slope of the loading front less than 10° relative to the horizontal, the operator, located inside the reactor, interrupted said loading several times (stopping the dispersion means) during the operation. More precisely, the interruptions took place, for example, at 15%, 30%, 50%, 70% and 90% of the amount loaded.

The operator then carried out, inside the reactor, generally in a hostile environment which may be dusty and also inserted with nitrogen, several measurements of the height of the catalyst bed using a ten-meter measure passed through the orifices of the load pre-distribution plate. Next, an examination of the surface of the bed was carried out visually in order to manually modify the adjustments, especially the closure means of the feed means in order to correct a possible unevenness of the loading front of the catalyst bed.

An experienced operator carried out the ten measurements with the ten-meter measure and the visual measurements in a time which was generally half an hour. Added to this downtime of the dispersion means, that is to say to the length of time for which loading is stopped, is a possible disassembly and reassembly of the dispersion means for adjusting the closure means of the feed means, an operation for which the average duration is around one hour.

Without counting the time needed for possible adjustments of the closure means of the feed means, and taking into account the number of stops mentioned above for a conforming loading, the total downtime of the dispersion means during the loading phase was equal to 2 h 30 min over a total time of 8 h 00 min for the loading of eight meters of the catalyst bed. This is around 30% of the loading time which was dedicated, in this process, to the verification of the proper operation of the dispersion and feed means.

2/Loading of the Upper Bed with the Device and the Process According to the Present Invention Since the feed means were equipped with closure means controlled by automated jacks, and the dispersion means were also equipped with automated jacks in order to be able to vary their position relative to the longitudinal axis of the reactor to be loaded, and the measurement means were of sonar type, and the measurements of the height of the catalyst bed and of the loading profile were carried out without stopping the dispersion means, the corrections made to the various functional means mentioned above were carried out in real time and automatically as a function of the analysis of the result(s) of the various measurements.

More precisely, the measurement means used in the present application was of the sonar type, with several sonars arranged at regular intervals over a hemisphere positioned under the hollow shaft of the dispersion means, said hemisphere being rotated around the axis of said hollow shaft.

The loading did not require the dispersion means to be stopped for possible manual controls, the presence of the operator in the internal hostile atmosphere of the reactor was no longer necessary, the loading time was reduced by around 30% compared to the loading time normally found in the art.

Furthermore, the loading quality was increased by continuous corrective actions and controls compared to only five controls as described in the present example for loading the lower catalyst bed of the reactor.

The use of the device and of the process according to the present invention for loading a chemical reactor with catalyst particles makes it possible to reduce the loading time by around one third, it also makes it possible to put an end to human interventions in hostile atmospheres, while improving the quality of said loading.

A complete application of the device and process according to the present invention is also found for the loading of "radial flow" reactors, especially the reactors of units for reforming hydrocarbons, with catalyst particles.

The invention claimed is:

1. A device for loading solid particles into a vessel comprising:
a particle feed means;

a means for dispersing the particles from the top to the bottom of the vessel, the dispersion means comprising a fixed hollow tube, installed inside a rotating hollow shaft;

several measurement means for simultaneously measuring a height of a filling bed and a loading profile at the time of loading, said several measurement means having different measurement axes for measuring a distance between the several measurement means and a certain number of points distributed substantially over an entire surface of a loading front, wherein the several measurement means are positioned inside the fixed hollow tube or inside the particle feed mean and is provided with at least one displacement means that allows each of the several measurement means, via a connection means, to be either housed in the fixed hollow tube or the particle feed means, or to partly or completely emerge from the fixed hollow tube or from the particle feed means; and at least one automated system for controlling at least one of the feed means and the dispersion means.

2. The device according to claim 1, wherein the same measurement means allows the measurement of the height of the filling bed and the measurement of the loading profile.

3. The device according to claim 1, wherein the several measurement means are positioned over a radius of a curve, a spheroidal shape or a cylindrical shape.

4. The device according to claim 1, wherein the means for measuring the loading profile is composed of several transceivers positioned in a hemisphere volume.

5. The device according to claim 1, further comprising means for comparing the desired and measured loading profiles, in particular these comparison means are computer implemented.

6. The device according to claim 1, further comprising an automated control system comprising jacks allowing automated actions for modifications of the adjustment parameters of at least one of the feed means and the dispersion means according to the data from at least one of the measurements of the height and from the analysis of the filling front of the catalyst bed during loading.

7. The device according to claim 1, wherein each of the several measurement means is firmly attached to the rotating hollow tube.

8. The device according to claim 1, wherein the means for measuring the height of the filling bed involves electromagnetic waves selected from the group consisting of radar waves, soundwaves, and sonar waves.

9. A method for hydrotreating hydrocarbons, wherein the method comprises carrying out a loading of at least one catalyst bed in a chemical reactor using the device of claim 1.

10. A method for reforming hydrocarbons, wherein the method comprises carrying out a loading of at least one catalyst bed in a chemical reactor using the device of claim 1, wherein the chemical reactor is a radial flow chemical reactor.

11. The device according to claim 1, wherein the means for measuring the height of the filling bed involves electromagnetic waves.

12. The device according to claim 11, further comprising at least one means enabling the means for measuring at least one of the height of the filling bed and the loading profile to carry out a translation in order to enter into and exit from the hollow of the fixed tube in order to take measurements.

13. The device according to claim 1, wherein each of the several measurement means is equipped with angular motor means.

14. The device according to claim 13, wherein the measurement angle determined between the axis (Y'Y) of the measurement means and the longitudinal axis (X'X) of the vessel to be loaded ranges up to 80°.

15. A process for loading solid particles into a vessel with a device as described according to claim 1, the process comprising the steps of:

flowing said particles from the top to the bottom;

measuring simultaneously at least one of the height of the particle bed and the loading profile of serveral surfaces or over the entire surface of the loading profile; and adjusting the loading parameters according to the measurement of at least one of the height of the filling bed, and the loading profile.

16. The process according to claim 15, wherein said measurement requires that loading be stopped for less than 10 minutes.

17. The process according to claim 15, wherein the parameters of the feed means and of the dispersion means are adjusted as a function of at least one of the measured height of the particle bed, and the loading profile, relative to a model that takes into account the internal geometric features of the vessel to be loaded.

18. The process according to claim 15, wherein the means for measuring the loading profile measures the height of at least one point for each unit of surface area representing less than 20% of the total surface area.

* * * * *